United States Patent [19]

Curtiss, Jr. et al.

[11] 4,265,293
[45] May 5, 1981

[54] CLOSED TUBE SIMPLIFIED RADIAL TIRE, TIRE/RIM ASSEMBLY AND METHOD OF MAKING SAME

[75] Inventors: Walter W. Curtiss, Jr., Akron; Patrick T. O'Flanagan, Lodi, both of Ohio

[73] Assignee: The Goodyear Tire & Rubber Company, Akron, Ohio

[21] Appl. No.: 141,709

[22] Filed: Apr. 18, 1980

Related U.S. Application Data

[63] Continuation-in-part of Ser. No. 929,861, Jul. 31, 1978, abandoned.

[51] Int. Cl.$^3$ .......................... B29H 17/20; B60C 9/02
[52] U.S. Cl. .......................... 152/354 R; 152/361 R; 152/378 R; 156/128 N; 156/133
[58] Field of Search ............... 152/330 R, 350, 354 R, 152/361 R, 375, 378, 393; 156/123 R, 124, 128 R, 128 N, 132, 133

[56] References Cited

U.S. PATENT DOCUMENTS

| | | | |
|---|---|---|---|
| 3,392,072 | 7/1968 | Alderfer | 156/123 R |
| 3,414,447 | 12/1968 | Travers | 156/133 |
| 4,052,237 | 10/1977 | Appleby et al. | 156/124 |
| 4,072,550 | 2/1978 | Stalter | 156/123 R |
| 4,121,162 | 12/1978 | DeWitt | 152/361 R |

FOREIGN PATENT DOCUMENTS

| | | | |
|---|---|---|---|
| 731436 | 4/1966 | Canada | 156/121 |
| 1170513 | 11/1969 | United Kingdom | |

*Primary Examiner*—John E. Kittle
*Attorney, Agent, or Firm*—D. M. Ronyak

[57] ABSTRACT

In a tire and rim assembly a high pressure pneumatic tube tire formed of a single closed toroidal ply the cords of which are angled to the circumferential direction of the tire and a single belt ply of opposite and lower angle to the circumferential direction of the tire. Anchoring means may be included to promote lateral stability and to provide engagement with the rim. Alternatively, the anchoring means may be eliminated by bonding the tire to the rim. The tire may be assembled on a conventional cylindrical tire building drum or upon the rim itself.

17 Claims, 6 Drawing Figures

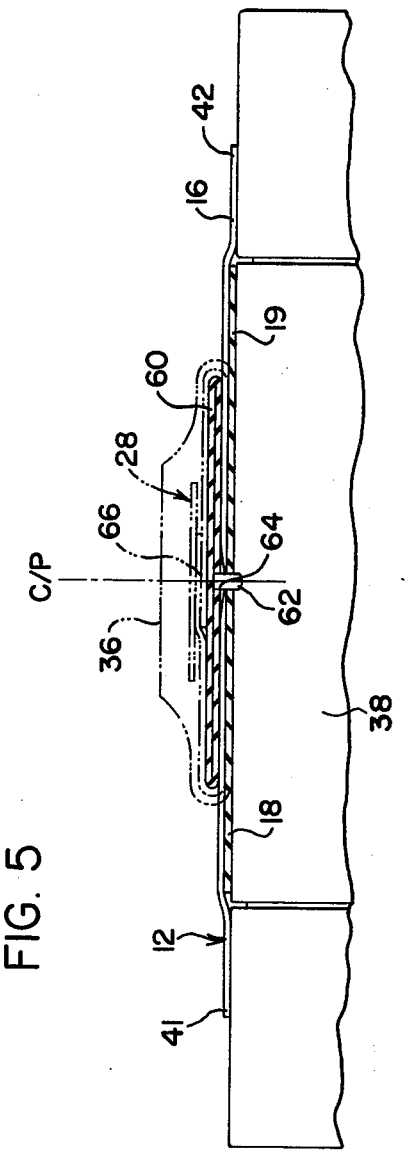

CLOSED TUBE SIMPLIFIED RADIAL TIRE, TIRE/RIM ASSEMBLY AND METHOD OF MAKING SAME

BACKGROUND OF THE INVENTION

This application is a continuation-in-part of application Ser. No. 929,861 filed July 31, 1978, now abandoned.

The foregoing abstract is not to be taken as limiting the invention of this application and in order to understand the full nature and extent of the technical disclosure of this application reference must be made to the accompanying drawings and the following detailed description.

This invention relates generally to pneumatic tires and more particularly to tires of a closed toroidal type of simplified radial construction, to tire and rim assemblies incorporating same, and to the method of making same.

"Closed tube tire" and "closed toroidal tire" as used herein will be understood to mean a tire providing a completely closed inflation chamber capable alone, without being mounted on a rim, of containing fluid pressure therein higher than the surrounding atmospheric pressure. In this specification, the terms "closed tube tire" and "closed toroidal tire" are used and intended to distinguish from open-base tires having generally horseshoe-shaped, radial cross-sections and spaced apart beads, thus not being capable of containing fluid pressure without being mounted on a rim.

When used in this specification, a substantially inextensible material refers to one whose elongation at tensile rupture does not exceed 5 percent. A cord formed of a substantially inextensible material may have an elongation at tensile rupture in excess of 5 percent.

"Radial" when used herein with respect to the direction of the cords of any reinforcing ply means that such cords form an angle greater than 75 degrees.

All angles or inclinations of tire components or portions thereof unless otherwise specified herein are to be taken with respect to a plane which is perpendicular to the axis of revolution of the tire.

Radial plane of a tire means any plane passing through that tire and containing its axis of revolution.

The state of development of pneumatic automotive tires today is such that vehicle disablement due to tire failure is a relatively infrequent occurrence. Tires having radially oriented carcass plies are in widespread use. Of growing importance is the need to conserve materials, particularly those which are petrochemical in nature. It is desirable to reduce tire and rim weight to decrease vehicle fuel consumption. These concerns have made it desirable to provide a lightweight pneumatic tire and rim assembly suitable for temporary use, especially with vehicles equipped with radial tires. It is also desirable to provide a tire which is capable of increased load-carrying capacity for its size and weight in comparison to known open-base tires. Although a closed tube tire may satisfy these requirements, closed tube tires such as are known today are relatively complex structures. Manufacture of a closed tube tire having radial sidewalls according to known methods is quite costly. One method involves winding the carcass cords or wrapping of the carcass ply about a toroidal mandrel, applying elastomer layers, belt reinforcement layers, and tread layers, curing of the assembly, and then removing the mandrel by dissolving same and washing out the residue through one or more valve openings. In another method, the tire carcass is formed upon a mandrel, then slit to remove it from the mandrel, then rejoined and inflated prior to completion of the assembly.

Accordingly, it is an object of this invention to provide a pneumatic tire of simplified closed tube construction having substantially radial sidewall portions.

Another object of this invention is to provide a pneumatic tire and rim assembly, said tire being of simplified closed tube construction and having substantially radial sidewall portions.

A further object of the invention is to provide a method of constructing a novel tube-type tire using known equipment and without the use of a core or mandrel.

Other objects will become apparent as the description proceeds.

SUMMARY OF THE INVENTION

The above objects along with other advantages may be obtained by a closed reinforced toroidal tire requiring only two plies of substantially parallel cords. The first or carcass ply has three distinct angular zones. In the base, i.e. the rim contacting portion of the tire, the angle of the carcass ply cords in the cured tire is substantially identical to that of the carcass ply cords in the uncured unshaped tire and is a relatively high angle, i.e. greater than about 60 degrees. In the sidewalls, the carcass ply cords are substantially radial, that is, are at an angle of at least 75 degrees. In the crown of the tire, the carcass ply cords are of relatively low angle, i.e. less than about 60 degrees, and lie in the opposite direction from the carcass ply cords in the base of the tire. The second ply or belt ply extends over the crown of the tire an amount substantially equal to that of the low angle carcass ply portion. The belt ply cords lie at an angle that is lower and is opposite in direction to that of the crown portion of the cords of the carcass ply. The base portion of the carcass ply is restrained to the rim by, for example, one or more anchoring hoops or belts formed of inextensible material, for example, steel wire. An inflation valve, sidewalls, and a tread, as are known in the prior art, are provided to complete the assembly.

The tire described herein is not to be limited to the method of making such a tire described herein.

The simplified radial tube tire herein described may be fabricated on a cylindrical drum. No mandrel or core is used. A ply of rubberized cord fabric whose cords lie at a relatively high angle, i.e. greater than about 60 degrees relative to the length of the ply is formed into a cylinder. After this, a layer of elastomer is placed over the carcass ply to form the inner liner of the tire. The anchoring means, if required, are then positioned on the outside surface of the cylindrical ply and elastomer layer. Preferably, at this time, an aperture is made in the elastomer layer and carcass ply and through which a valve core is inserted into a recess in the drum. The radially outermost surface of the cylindrical elastomer layer is then treated with an anti-adhesive material. Following this, the edges of the elastomer layer and carcass ply are brought together such that they overlap the circumferential centerline of the structure and the edges of the elastomer layer are pressed firmly together and thereby joined. A sealing strip is positioned on the radially inner side of the liner elastomer layer such that it overlaps and seals the elastomer layer splice. The edges of the carcass ply are pressed firmly together and thereby joined to form a collapsed or flattened closed annular tube. A belt ply of substantially inextensible cords which lie at a relatively low angle, i.e. less than about 45 degrees, and opposite to the angle of the cords of the radially outermost layer of the carcass ply is then axially centered over the tube in an adherent manner. Over this is placed a tread as is known in the art. Sidewalls are added to complete the green unshaped tire. The completed green tire is then shaped to a toroidal configuration by inflation pressure and cured. Shaping preferably occurs in a mold. The structure is preferably inflated via a valve core in the curing mold to bring it into its final toroidal shape before curing.

In an alternate method a simplified radial tube tire is fabricated using a pre-cured tube including an inflation valve in place of an uncured cylindrical elastomer layer and the separate addition of an inflation valve. Anchoring means, if present, are added before positioning the tube on the cylindrical carcass ply.

During shaping of the structure, the cords of the carcass ply and belt ply undergo considerable movement to reach their final positions as described above. There is no substantially circumferential cord movement of the carcass ply cords in the base of the tire. The anchoring means, if present, do not rotate or move axially.

BRIEF DESCRIPTION OF THE DRAWINGS

FIG. 5 is similar to FIG. 2 except that the tire is being fabricated using a pre-cured flattened tube.

DESCRIPTION OF THE INVENTION

Figure 1:
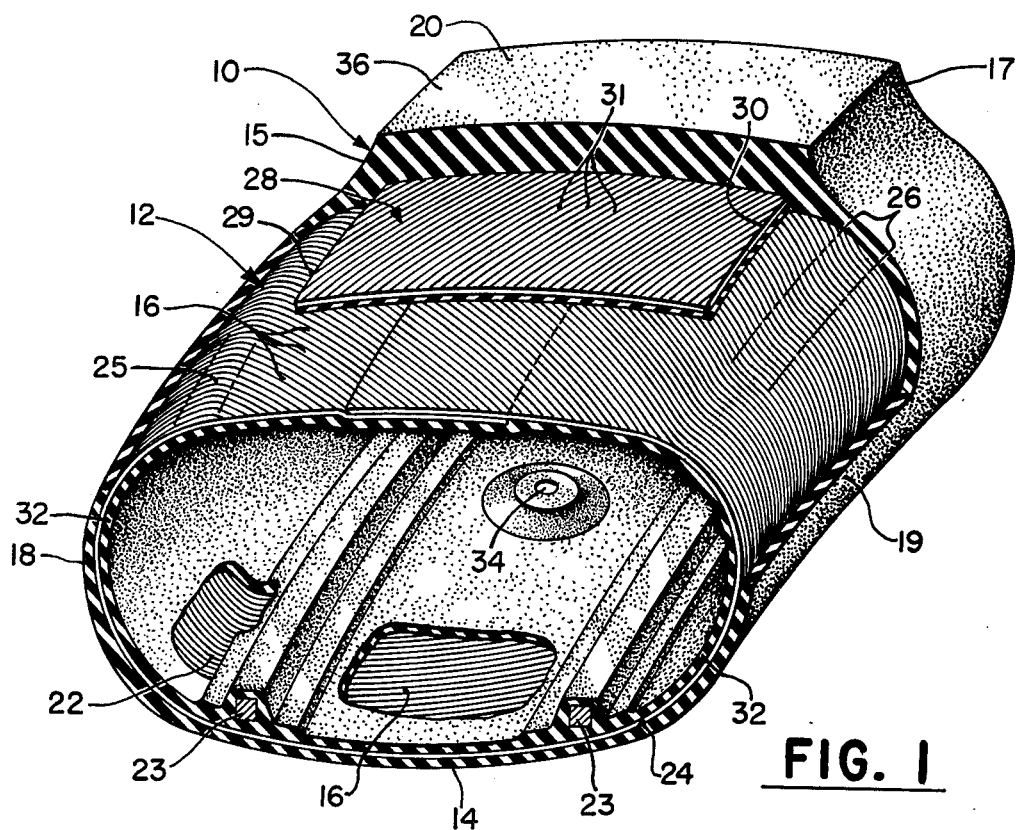
FIG. 1 is a perspective view of a broken away portion of the simplified radial tube tire with additional structure broken away to show internal detail.

Referring to FIG. 1, the general overall appearance of the completed closed tube simplified radial tire 10 is seen. The elastomer-coated first or carcass cord ply 12 has three distinct angular regions, according to location in the tire. In the base or rim-contacting portion 14 of the tire 10 each cord 16 of the carcass ply 12 has an angle substantially identical to that of the carcass ply in the green tire, e.g. about 77 degrees. In the sidewalls 18,19 each cord 16 of the carcass ply 12 forms an angle of about 90 degrees; in the crown 20 each cord 16 of carcass ply 12 lies at a low angle, e.g. about 45 degrees, and is in the opposite direction when compared to the cords in the base 14. First transition zones 22,24 connect that portion of carcass ply 12 in base 14 and sidewalls 18,19, respectively, of tire 10. If, as shown anchoring means are present, first transition zones 22,24 begin at the axially outermost edges of the anchoring means 23 of tire 10. The path of each cord 16 in these first transition zones is curved. Second transition zones 25,26 exist at the shoulders 15,17, respectively, of the crown 20 of tire 10 and coincide approximately with the axially outermost edges 29,30 of the belt 28. The path of each cord 16 in zones 25,26 is also curved. Each cord 16 of the carcass ply 12 completely encircles in predominantly axial direction a circumferentially elongated segment of the tire, said segment being defined by two circumferentially spaced radial planes of the tire. A single carcass ply cord 16 does not lie in a single radial plane. The ends of any given carcass ply cord 16 are circumferentially displaced from one another. The ends of the carcass ply cords 16 overlap in the crown 20 of the tire. The amount of overlap may be minimal, that is, an amount sufficient to effect a splice and able to withstand shaping by inflation of the green, i.e. uncured, tire or may be equal to the belt ply 28 in width to provide additional reinforcement in the crown of the tire. The belt ply 28 is comprised of cords 31 which are substantially inextensible. The belt ply 28 is preferably of about the same width as the tread 36 of the tire. Cords 31 of belt ply 28 lie at a very low angle, for example, about 15 degrees and are opposite in direction when compared to that portion of the cords 16 of the carcass ply 12 lying immediately radially inward thereof. Although a single belt ply is shown, multiple belt plies may be employed. Liner 32 is provided to prevent permeation of the inflation gas through the structure. A pre-cured elastomeric composition inflation tube can be substituted for liner 32 at the time of manufacture of the tire. Valve 34 is provided to enable inflation of the structure. Valve 34 could also be located in one of sidewalls 18,19 instead of in the base 14 of the tire. Conventional tread 36 and sidewalls 18,19 are placed radially outward of the carcass/belt structure to complete the tire.

Figure 2:
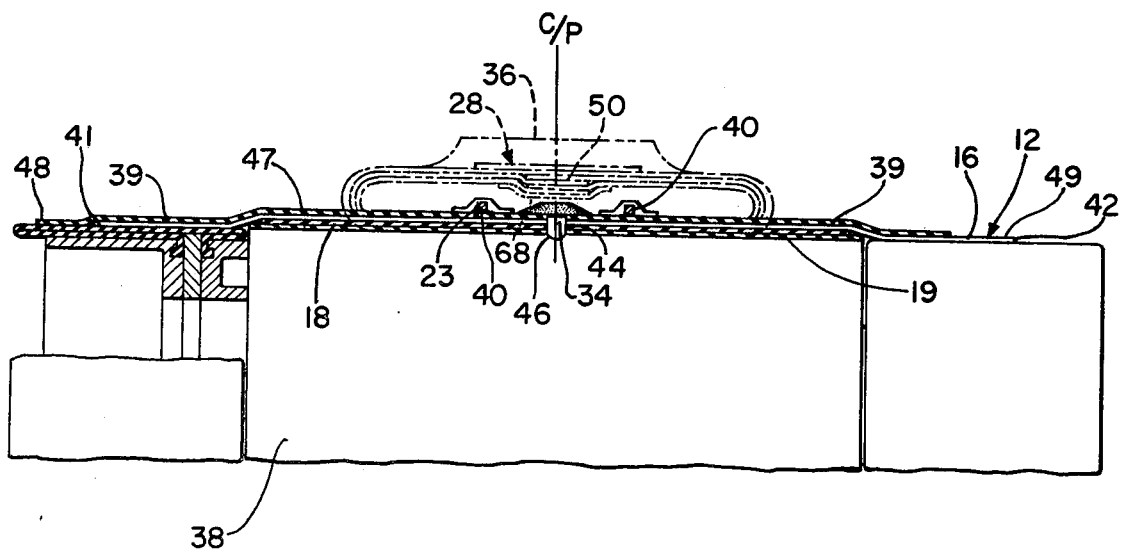
FIG. 2 is a radial cross-section of a portion of the building drum with the components of a simplified radial tube tire placed thereon but not yet made into a closed tube. The step of turning up the edges of the material to form a closed tube is indicated in dotted lines and the thickness of the plies somewhat exaggerated.

FIG. 2 illustrates a preferred method of fabrication of a simplified closed toroidal radial tire. Sidewalls 18,19 are placed on the cylindrical drum or former 38. A carcass ply 12 of cord fabric, the cords 16 of which lie at a relatively high angle but less than 90 degrees, for example, about 77 degrees with respect to the lengthwise direction of the carcass ply 12, is placed upon the drum 38 and its longitudinal ends joined to form a complete cylinder. The angle of the cords 16 of the carcass ply 12 is other than a right angle with respect to the circumferential direction of the cylinder. A layer 39 of elastomer composition is then added to form the impermeable inner liner 32 of the tire. Anchoring means 23 of a substantially inextensible material, for example, metallic wire, fiberglass, or high modulus organic fiber, or the like, such as hoops 40 are placed upon layer 39 at axially spaced apart locations corresponding to the width of the base 14 of tire 10 and centered relative to the edges 41,42 of the ply 12. An aperture 44 is formed through the carcass ply cylinder between the anchoring hoops 40, and an inflation valve 34 is inserted therein. A suitable recess 46 should be provided in the building drum 38 for acceptance of the valve. The radially outermost surface 47 of the liner elastomer composition layer 39 is then treated with a suitable anti-adhesive selected from those well known in the art. It is preferable to utilize a plastic film (not shown) such as polyvinylidene chloride as an anti-adhesive to insure that the anti-adhesive does not flow into and contaminate the carcass ply/liner assembly splices. Following application of the anti-adhesive layer the edges 48,49 of the carcass ply/liner assembly are lifted radially outward from the drum 38 and pulled axially toward one another until they overlap in the radially outward portion of the structure. The overlapped carcass ply/liner assembly is shown by the dotted lines of FIG. 2. These may be interleaved (not shown). The overlapped area need not be centered with respect to the centerplane CP of the structure, but preferably is centered. A sealing strip 68 is positioned such that it covers the overlapped area. The sealing strip 68 is preferably of a compound having a low mooney viscosity which is highly adherent to the liner forming layer 39 prior to curing of the tire. The overlapped area 50 is pressed firmly in conventional manner to seal the area and to form a flat tube. The sealing strip 68 aids in forming an airtight seal since it is plastic and highly adherent to the layer 29. A single belt ply 28 having cords 31 at an angle opposite to those of the crown area carcass ply 12 and much smaller, e.g. about 20 degrees, is then centered over the anchoring hoops 40 and stitched thoroughly to the carcass ply 12. The structure is completed by addition of a tread 36 as in a conventional tire. The completed structure is then removed from drum 38. A slightly collapsible or tapered drum (neither is shown) may be used to facilitate removal of the completed uncured tire.

In FIG. 5 there is illustrated another method of fabricating a simplified closed toroidal radial tire. Sidewalls 18,19 are placed on the cylindrical drum or former 38. A carcass ply 12 of elastomer coated cord fabric, is placed on drum 38 and its longitudinal ends joined to form a cylinder. The cords 16 of carcass ply 12 lie at a relatively high angle but less than 90 degrees, for example, about 77 degrees with respect to the lengthwise direction of the carcass ply 12. The angle of the cords 16 of the carcass ply 12 do not form a right angle with respect to the circumferential direction of the cylinder. An uninflated flat prevulcanized tube 60 including an inflation valve 62 is positioned over the carcass ply 12. The tube 60 is approximately centered relative to the edges 41,42 of carcass ply 12. An aperture 64 is formed through the carcass ply 12 and sidewalls 18,19 for receipt of the inflation valve 62. A suitable recess should be provided in the building drum 38 for acceptance of the valve 62. The edges 41,42 of the carcass ply 12 are lifted radially outwardly of the drum 38 and pulled axially toward one another until they overlap in the radially outward portion of the structure. The carcass ply 12 is thus wrapped around the tube 60. Because the sidewalls 18, 19 are adhered to the carcass ply 12, the axially distal ends of the sidewalls are simultaneously drawn radially outwardly of the drum 38 and wrapped partially around the tube 60. The overlapped carcass ply and sidewall assembly is shown by the dotted lines in FIG. 5. The overlapped area 66 is pressed together firmly and completely envelops and reinforces tube 60. A belt ply 28 having cords 31 at an angle opposite to those of the crown area carcass ply 12 and much smaller, e.g. about 20 degrees, is then centered over the reinforced flattened tube and pressed firmly to cause the belt ply 28 to adhere to the carcass ply 12. The structure is completed by adding a tread 36 as in a conventional tire, the circumferentially extending edges of the tread joining with the sidewalls 18,19 to completely envelop the reinforcing plies 12 and 28 in the elastomer composition. The completed structure is then removed from the drum 38.

Anchoring means such as 23 in FIGS. 1 and 2 are not included in the example of FIG. 5. It is intended that the tire resulting from the method shown in FIG. 5 will be adhered to its complementary rim either upon or after curing. If it is desired, of course, anchoring means could be added prior to placement of tube 60 on the carcass ply 12.

In the method illustrated in FIG. 5, no sealing strip of low plasticity elastomer composition is needed. No adhesive or preparation of tube 60 is required to promote adhesion of the carcass ply 12 to tube 60. Tube 60 may be manufactured in accordance with well known methods. It is desired that tube 60 be manufactured slightly undersize of the combined circumference of the drum 38 plus sidewalls 18,19 and carcass ply 12 so that the tube 60 will be in tension when placed over carcass ply 12. This facilitates completion of the tire since the undersized tube 60 will assume a stable, flat, cylindrical configuration on the drum 38.

Figure 3A:
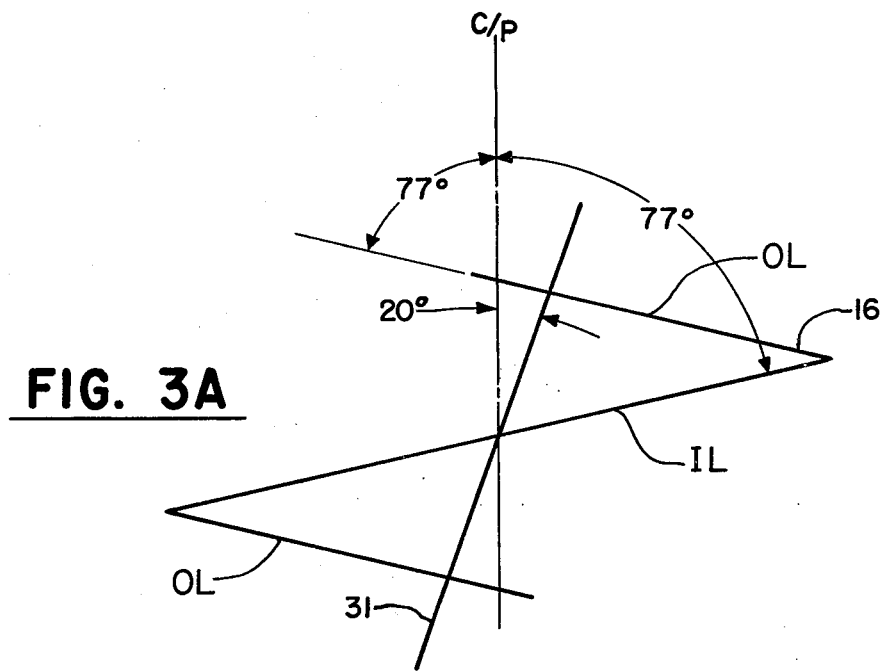
FIG. 3A is a schematic plan view illustrating the cord arrangements of the green tire prior to shaping from cylindrical to toroidal configuration.
Figure 3B:
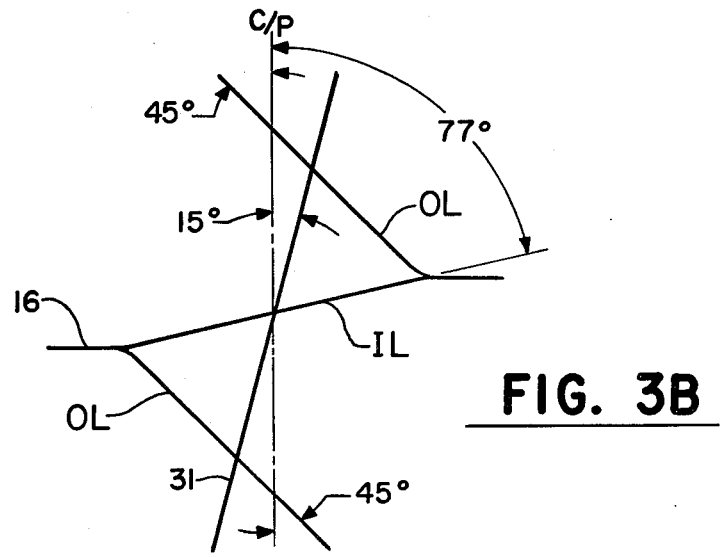
FIG. 3B illustrates schematically in plan view the cord arrangement of the tire after expansion into toroidal configuration.

The uncured tire preferably is then placed in a suitable curing mold cavity (not shown) and the valve 34 coupled to an inflation source. Upon application of the inflation pressure the structure expands from a flat cross-sectional configuration to assume the internal shape of the mold, that is, to a substantially toroidal configuration. For it to do so, the carcass ply and belt ply cords 16,31 must undergo considerable movement relative to one another. These movements are schematically illustrated in FIGS. 3A and 3B. The initial arrangements of the cords 16,31 are shown in FIG. 3A. In FIG. 3A, a single cord 16 of the carcass ply 12 forms an angle of about 77 degrees with the radially inner layer (indicated by IL) and radially outer layer (indicated by OL) being oppositely directed. A single cord 31 of the belt ply 28 forms an angle in the opposite direction to the radially outermost layer (OL) of carcass ply 12 of about 20 degrees.

The final arrangements of the cords 16,31 are shown in FIG. 3B. That portion of each carcass ply cord 16 lying in the base 14 of the tire 10 and between the axially most distant extremities of the anchoring hoops 40 continues to lie at an angle of about 77 degrees. In other words, the base 14 of the tire 10 does not undergo movement during shaping of the tire. That portion of each carcass ply cord 16 in the crown 20 of tire 10 has moved radially outward from the base 14 and pantographed to a much lesser angle, e.g. about 45 degrees, and continues to lie in the same direction. Both portions of each carcass cord 16 underlying the sidewalls 18,19 of the tire have increased in angle from their initial angle to become substantially radial, and in the embodiment shown form an angle of about 90 degrees. Each belt ply cord 31 has pantographed from its initial angle to a reduced angle of about 15 degrees.

The anchoring means, when employed, should be formed of a substantially inextensible material.

One or more belts (not shown) of rubberized cord fabric may be substituted for hoops 40. The axially most distant edges of such belt or belts should lie at about the same location from the circumferential centerplane of the tire as do hoops 40. The cords of such belt or belts should be of low angle, preferably in the range of 0 to 10 degrees. When such anchoring belts are employed, the valve core 34 may be inserted through the anchoring belt or belts.

The starting angle, i.e. in the unshaped green tire, for the cords 16 of carcass ply 12 should be relatively high, that is, greater than 45 degrees but less than 90 degrees, and preferably from about 60 degrees to 85 degrees. In the cured tire, the cords of the carcass ply in the sidewalls for at least 60 percent of the radial height of the sidewalls should be substantially radial, that is, at an angle of at least 75 degrees. The angle of the cords of the carcass ply 12 in the sidewalls 18,19 of the cured tire will always be greater than the angle of the cords of the carcass ply in the crown 20 or base 14 of the cured tire. The angle of the cords of the carcass ply 12 in the crown 20 of the cured tire should be a relatively low angle, that is, not exceeding 60 degrees. The lower the angle of the cords of the carcass ply in the crown of the tire, the greater their contribution to circumferential restriction of the tire.

"Blow-up ratio" as used herein is the ratio of the diameter of the crown portion of the carcass ply at the centerplane CP of the shaped tire to the diameter of the crown portion of the carcass ply after being formed into a flattened closed tube (on the building former) but prior to shaping by inflation. As the blow-up ratio of the tire is increased, the amount of cord movement during shaping of the tire is increased, for the cords of the carcass ply and for the cords of the belt ply.

The starting angle for the cords of the carcass ply for a given desired cured angle is dependent, in part, on the blow-up ratio of the tire. As the blow-up ratio is increased, the starting angle of the cords of the carcass ply for a given desired cured angle should be decreased.

The starting angle for the cords of the belt ply 28 or plies should be relatively low angle, that is, less than 45 degrees, and preferably less than 35 degrees. The cured angle of the cords of the belt ply or plies should be less than 35 degrees, and preferably less than 25 degrees. The lower the angle of the cords of the belt ply or plies, the greater their contribution to the circumferential restriction of the tire. The practical lower limit for the starting angle of the cords of the belt ply or plies is believed to be about 15 degrees with known cords and fabrics suitable for tire reinforcement. Lower angles are not practical because cord lock-up (physical interference) occurs at very low blow-up ratios, unless the initial cord spacing is so increased that the fabric is not of sufficient strength. The introduction of fabrics having higher tensile strength cords of smaller cross-sectional area and greater distance between the longitudinal axes of adjacent cords will permit use of lower starting angles for a given blow-up ratio.

The starting angle for the cords of the belt ply for a given desired cured angle is also dependent in part on the blow-up ratio of the tire. As the blow-up ratio of the tire is increased, the starting angle of the cords of the belt ply for a given desired cured angle should be increased.

A tire according to the invention may be separately molded, or integrally molded with a rim. In the latter case, the tire is preferably built and cured upon the rim. When the tire is bonded to the rim, the need for anchoring hoops 40 or their equivalent is eliminated.

When the tire is built and cured upon its rim, the carcass ply 12 prior to forming into a flat tube, may not form a true mathematical cylinder but may form a sleeve of varying diameter along its axis of revolution according to the rim configuration. In the following claims it is understood that the use of the word "cylinder" or "cylindrical" with reference to the carcass ply includes such a sleeve whose diameter varies with location along its axis of revolution, as well as one of unvarying diameter.

Figure 4:
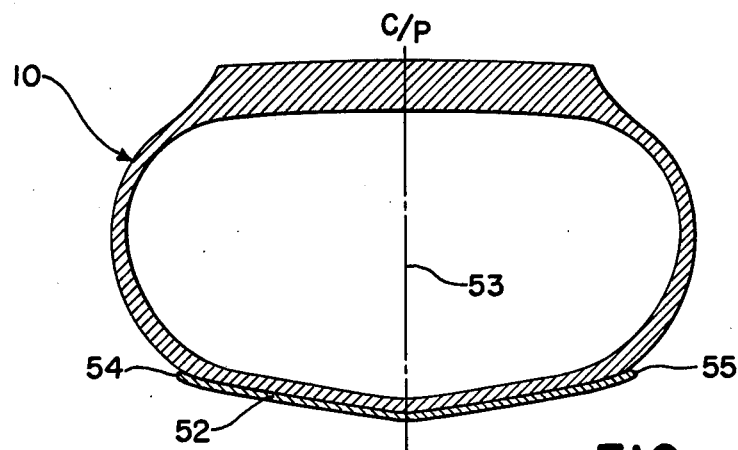
FIG. 4 is a radial cross-section of a rim suitable for use in building, curing and operating the simplified radial tube tire.

An embodiment of a suitable rim is shown in FIG. 4. The rim 52 is of circular configuration and is adapted to be fastened to a vehicle wheel disc (not shown). The rim is preferably of least circumference at its axial centerplane 53 and increases in gradual manner in circumference from its axial centerplane to its axially most distant edges 54,55. The rim preferably is of a V-shaped cross-sectional configuration as shown or of arcuate cross-sectional configuration (not shown). A cylindrical rim of unvarying diameter along its axis of revolution may also be used.

While certain representative embodiments and details have been shown for the purpose of illustrating the invention, it will be apparent to those skilled in the art that various changes and modifications may be made therein without departing from the spirit or the scope of the invention.

What is claimed is:

1. A closed tube tire having a carcass ply of substantially parallel cords extending continuously and completely around a circumferentially elongated segment of said tire, said cords of said carcass ply in the crown of said tire being inclined to a plane perpendicular to the axis of revolution of said tire, said cords of said carcass ply in the sidewalls of said tire being substantially radial, said cords of said carcass ply in the base of said tire being oppositely inclined to said plane an amount greater than in the crown of said tire, and in the crown of said tire a belt ply of substantially parallel cords which are oppositely inclined to said cords of said carcass ply in said crown.

2. A closed tube tire according to claim 1, wherein each of said cords of said carcass ply in passing from the base to a sidewall is connected by a first curved zone and in passing from a sidewall to the crown is connected by a second curved zone.

3. A closed tube tire according to claim 2, wherein said second curved zone at least partially underlies the axial edges of said belt ply.

4. A closed tube tire according to claim 1, wherein the ends of each of said carcass ply cords are overlapped in said crown.

5. A closed tube tire according to claim 1, wherein said belt ply cords are less inclined to said plane than said cords of said carcass ply in the crown of said tire.

6. A closed tube tire according to claim 1, wherein said belt ply is formed of cords of substantially inextensible material.

7. A closed tube tire according to claim 1, having anchoring means of substantially inextensible material in the base of said tire which means are enveloped by said carcass ply.

8. A closed tube tire according to claim 7, wherein said anchoring means comprise a belt of substantially parallel reinforcing cords which are inclined to said plane an amount not exceeding about 10 degrees.

9. A closed tube tire and rim assembly, said tire having a carcass ply of substantially parallel cords extending continuously and completely around a circumferentially elongated segment of said tire, said cords of said carcass ply in the crown of said tire being inclined to a plane perpendicular to the axis of revolution of said tire, said cords of said carcass ply in the sidewalls of said tire being substantially radial, said cords of said carcass ply in the base of said tire being oppositely inclined to said plane an amount greater than in the crown of said tire, and in the crown of said tire a belt ply of substantially parallel cords which are oppositely inclined to said cords of said carcass ply in said crown, said tire being bonded at its base to an annular rim.

10. A closed tube tire and rim assembly according to claim 9, wherein said rim is of least circumference at its axial centerplane and increases in circumference in gradual manner from its axial centerplane to its axial extremities.

11. A closed tube tire and rim assembly according to claim 10, wherein said rim is of arcuate radial cross-section.

12. A closed tube tire and rim assembly according to claim 10, wherein said rim is of V-shaped radial cross-section.

13. In a method of making a closed tube tire according to claim 1, said method comprising forming a cylinder of a carcass ply of rubberized cord fabric the cords of which are substantially parallel and which form an angle other than a right angle with the circumferential direction of said cylinder, adhering a layer of elastomer composition to the radially outermost surface of said carcass ply cylinder, forming an aperture through said cylinder and inserting a valve core into said aperture, lifting the edges of said carcass ply and elastomer composition layer radially outwardly and drawing the edges of said carcass ply and said layer axially toward one another, joining said edges radially outwardly of the base of said tire to form a flattened tube, adhering to a radially outer surface of said tube, as a narrower ply a belt ply of substantially parallel cords with the cords of said belt ply being oppositely inclined to and forming a lesser angle than the radially outermost portion of the cords of said carcass ply with the circumferential direction of said tube, and inflating said tube into a toroidal shape.

14. In a method of making a closed tube tire according to claim 1, said method comprising forming a cylinder of a carcass ply of rubberized cord fabric the cords of which are substantially parallel and which form an angle other than a right angle with the circumferential direction of said cylinder, forming an aperture in said carcass ply cylinder, superposing on said carcass ply cylinder a pre-cured elastomeric flattened tube including an inflation valve core and inserting said valve core into said aperture, lifting the edges of said carcass ply cylinder radially outwardly and drawing said edges axially toward each other to envelop said tube with said carcass ply and form a reinforced flattened tube, adhering to the radially outer surface of said reinforced tube a belt ply of substantially parallel rubberized cords with the cords of said belt ply being oppositely inclined to and forming a lesser angle than the cords of the radially outermost folded over portion of said carcass ply with respect to the circumferential direction of said reinforced tube, and inflating said tube into a toroidal shape.

15. In a method of making a closed tube tire according to claim 13 or 14 in which the initial inclination of said carcass ply cords with respect to the circumferential direction of said cylinder is at least 60 degrees but less than 85 degrees and the initial inclination of said belt ply cords with respect to the circumferential direction of said tube is not greater than 35 degrees.

16. In a method of making a closed tube tire according to claim 13 or 14, wherein a sidewall is added prior to application of said carcass ply and a tread is added prior to inflation of said tube.

17. In a method of making a closed tube tire according to claim 13 or 14, in which anchoring means are applied over said carcass ply prior to joining the edges of said carcass ply to form a flattened tube, the axial extremities of said means substantially corresponding with the axial extremities of the base of said tire.

* * * * *